United States Patent [19]
Barker et al.

[11] Patent Number: 5,105,130
[45] Date of Patent: Apr. 14, 1992

[54] KEYBOARD CONTROLLED MULTI-FUNCTION POWER TOOL WITH VISUAL DISPLAY

[75] Inventors: Gordon Barker, Castletown; David M. Shaw, Barnard Castle, both of United Kingdom

[73] Assignee: Black & Decker Inc., Newark, Del.

[21] Appl. No.: 354,615

[22] Filed: May 19, 1989

[30] Foreign Application Priority Data

May 24, 1988 [GB] United Kingdom ............... 8812292

[51] Int. Cl.$^5$ ............................................. H02P 7/00
[52] U.S. Cl. .................................... 318/268; 388/809
[58] Field of Search .............. 318/268, 271, 284, 369; 408/6, 8, 9, 10, 11, 12; 388/310, 810, 814; 340/711, 718

[56] References Cited

U.S. PATENT DOCUMENTS

| | | | |
|---|---|---|---|
| 4,237,408 | 12/1980 | Frecks | 318/571 |
| 4,412,158 | 10/1983 | Jefferson et al. | 318/284 X |
| 4,513,381 | 4/1985 | Houser, Jr. et al. | 408/9 X |
| 4,571,687 | 2/1986 | Fukuyam et al. | 408/11 X |
| 4,636,961 | 1/1987 | Bauer | 312/490 |
| 4,673,318 | 6/1987 | Hornung et al. | 402/9 |
| 4,689,534 | 8/1987 | Gerber et al. | 388/810 |
| 4,791,344 | 12/1988 | Yoshida et al. | 318/369 X |

FOREIGN PATENT DOCUMENTS

| | | |
|---|---|---|
| 0086114 | 8/1983 | European Pat. Off. . |
| 191405 | 8/1986 | Japan ................................. 318/369 |

Primary Examiner—William M. Shoop, Jr.
Assistant Examiner—Anthony Wysocki
Attorney, Agent, or Firm—Dennis A. Dearing; Charles E. Yocum; Edward D. C. Bartlett

[57] ABSTRACT

A multi-function hand-held power tool includes an electric motor for driving a tool holder and control means for energizing the motor in accordance with a selected combination of operating conditions under which the tool is to be used. Located on the housing of the tool is a keyboard for inputting to the control means information to define the selected combinations of conditions. The keyboard has a first single key for selecting a tool function, for example drilling, from a defined range of tool functions, a second single key from selecting a required workpiece material for example wood, from a defined range of workpiece materials, and two further keys for selecting, from a defined range, another parameter, for example drill size, appropriate to the selected tool function. A visual display also located on the tool housing is energizable to show symbols indicative of the selected combination of operating conditions.

17 Claims, 3 Drawing Sheets

KEYBOARD CONTROLLED MULTI-FUNCTION POWER TOOL WITH VISUAL DISPLAY

BACKGROUND OF THE INVENTION

This invention relates to power tools for example hand-held power tools and bench-mounted power tools. The invention has particular reference to hand-held and bench-mounted power drills.

The efficient and economic use of power tools depends upon the correct selection of operating conditions. For example, in a power drill, the speed of rotation of the drill bit depends upon the drill size and the material of the workpiece upon which the drill is to be used.

It has been proposed to employ electronic means to determine the speed of the motor driving the tool holder of the power tool in accordance with information fed to the means by a user. Information may be fed via a keyboard with a plurality of keys, a selection of which has to be operated by a user to input the required information to the means.

Use of such power tools requires preliminary study of operating instructions and care when inputting information and this may inhibit the purchase of such tools by some potential users.

SUMMARY OF THE INVENTION

According to the present invention, a power tool comprises an electric motor, a tool holder drivable by the motor, control means for determining the rotational speed of the motor in accordance with a selected combination of operating conditions under which the too is to be used, a keyboard located on the housing of the tool for inputting information to the control means to define the selected combination of operating conditions, the keyboard comprising a first single key operable to select a required tool function from a range of tool functions defined by the control means, a second single key operable to select a required workpiece material from a range of workpiece materials defined by the control means, at least one further key operable to select, from a range defined by the control means in accordance upon the selections resulting from operation of the first and second keys, a parameter appropriate to the selected too function and material, and a visual display also located on the housing of the tool and energisable to display symbols indicative of at least the selected function and, where applicable, a symbol indicative of the parameter.

In one embodiment of the invention, two further keys are provided, one of which steps the selection from one end of the defined range to the other, and the other steps the selection in the opposite direction.

A "cancel" key may be provided, operation of which inputs a predetermined combination of operating conditions to the control means.

The range of tool functions may include drilling and screwdriving in which case operation of the further key may select a drill size from a range of drill sizes defined by the control means, or may select a torque level from a range of torque levels.

Energisation of the motor may be controlled by a trigger-operated switch fitted with lock-on facilities, and in which there is a safety circuit responsive to the condition of the switch and which inputs that condition to the control means and, in the event that the switch is in the locked-on condition, energisation of the motor is prevented and a fault symbol is displayed on the display.

Speed sensing means may be provided for sensing the actual motor speed and for indicating the sensed speed to the control means which uses the indication to maintain the motor speed at the determined value.

The control means may operate on energisation, to cause the display to display all the symbols for a limited time period only.

On the expiry of the limited time period, the control means operates to set up a predetermined combination of operating conditions.

Where the range of functions includes screwdriving, the range of torque levels selectable may include a further level settable by torque responsive means at the termination of a screwdriving operation and retained by the control means for use in subsequent screwdriving operations carried out whilst the further level remains selected.

BRIEF DESCRIPTION OF THE DRAWINGS

By way of example only, a hand-held power drill embodying the invention will now be described in greater detail with reference to the accompanying drawings of which.

DETAILED DESCRIPTION OF THE PREFERRED EMBODIMENT

Figure 1:
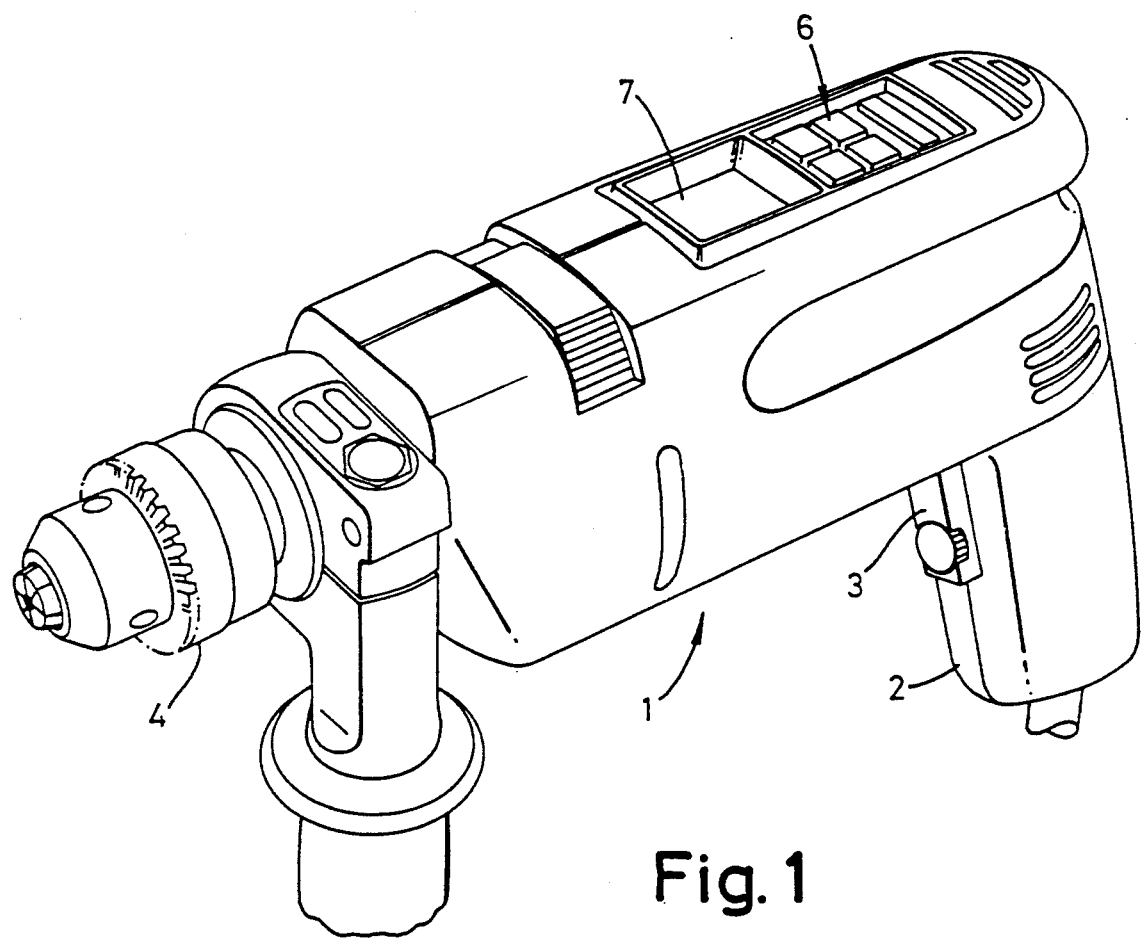
FIG. 1 is a perspective view of the drill.

The drill shown in FIG. 1 is of generally conventional outward appearance having a body 1, a handle 2 with a trigger 3 that controls an ON/OFF switch housed in the handle 2. The trigger 3 also incorporates a reversing switch (not shown). A chuck 4 is mounted on the end 5 of a drive shaft that projects from the body 1.

Located upon the upper surface of the body 1, in a position easily accessible to, and easily visible to, a user, is a keyboard 6 and a display screen 7, for example an LCD display. The keyboard 6 and display 7 are part of a unit that is accommodated within the upper part of the body 1 and that is held between the clam shell halves that make up the body 1 and handle 2.

The keyboard has a membrane that covers the keyboard and has upstanding portions that identify the individual keys. Beneath the surface of the upstanding portions are located the movable elements of the key switches. Such elements may comprise blocks of conductive rubber that are attached to or integral with the membrane and which co-operate with fixed contacts on a surface below the membrane to form the key switches Downward pressure on an upstanding portion brings the block of conductive rubber into electrical contact with the respective fixed contact. As soon as the pressure is removed, the block moves away from the fixed contact.

Figure 2:
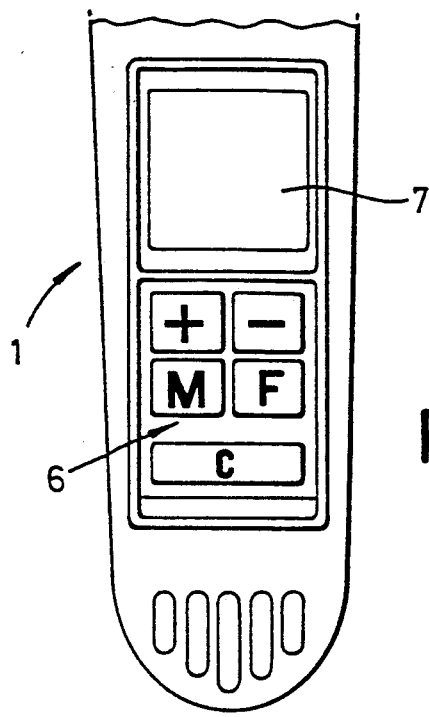
FIG. 2 is a plan view of part of the drill.

As can be appreciated from FIG. 2, five keys are provided. The tops of the upstanding portions are marked to identify the particular switches located beneath them. FIG. 2 shows the markings M, F, +, −, C which identify respectively the material selection key, the function selection key, step-up key, step-down key and cancel key.

Key F is used to select the function that the drill is required to carry out. A fixed number of functions is catered for by the drill control means and these are drilling; screwdriving, small screws; screwdriving, large screws; holecutting; polishing and wire brushing. Key F is a standard "jogging" key and successive depressions operate to step from one function to the next.

Key M is used to select the material of the workpiece that the drill is to be used on. A fixed number of materials is catered for by the drill control means and these are wood, steel, masonry and aluminium. Key M is also a standard jogging key and successive depressions operate to step from one material to the next. Key M is inhibited when functions other than drilling and hole cutting are selected.

Keys + and − are auto jogging keys and their actuation has a different result depending upon the function selected by operation of key F. Thus, if drilling is selected, keys + and − are used to select from a fixed range of drill sizes catered for by the drill control means the size that is to be used. Each successive operation of the + key steps upwardly through the range of drill sizes, whilst operation of the − key steps down through the range. Additionally, maintained operation of either the + or − key will step from one drill size to the next at intervals of 0.5 seconds until the key is released.

Key C is a cancel or override key, operation of which cancels the effect of the previous operation of a key or keys and also allows the motor control means to return to a preset default condition to be described below.

Also located on the upper part of the body 1 is a selector enabling a user to select hammer or non-hammer mode.

The visual display is an LCD display constructed to show, at selected positions, symbols indicating the functions, the material and other parameters.

Figure 3:
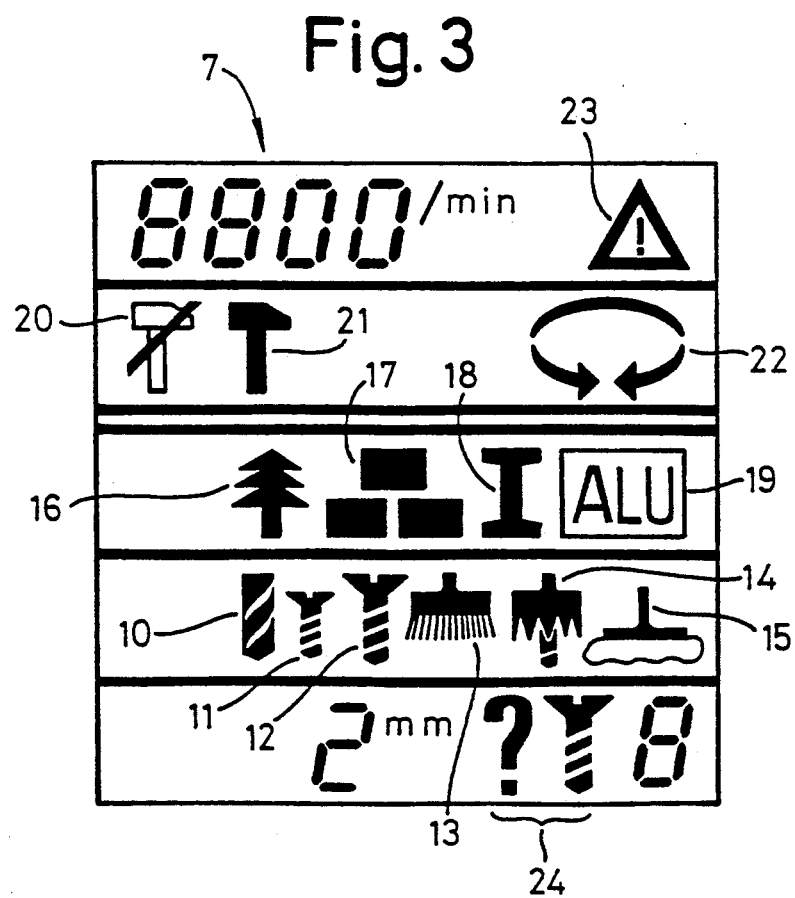
FIG. 3 is a diagrammatic illustration on an enlarged scale of the visual display.

FIG. 3 shows, on an enlarged scale, the screen and all the symbols that can be displayed.

Functions are shown over an area across the screen. Symbols 10, 11, 12, 13, 14 and 15 indicate respectively drilling, screwdriving low speed, screwdriving high speed, wire brushing, hole cutting, and polishing.

Materials are shown over an area across the screen below that just mentioned. Symbols 16, 17, 18 and 19 indicate, respectively, wood, masonry, steel and aluminium.

Symbols 20, 21 indicate to the user whether he has selected "non-hammer" or "hammer" mode.

Symbol 22 indicates the direction of rotation of the drill chuck and, in use, only one part of the symbol will be displayed, that part being the arrow indicating the direction or rotation that has been selected.

As can be seen from FIG. 3, symbols 20, 21 and 22 appear across the screen above the material symbols.

The display is also able to display actual drill motor speed in revolutions per min. and FIG. 3 shows, as an example only, a speed of 8800 in a part of the display screen above symbols 20, 21 and 22.

In the same part of the screen as the speed display but to the right thereof is shown a warning symbol 23, the meaning of which will be explained below.

In the lowermost part of the display screen below the function symbols is an area in which is displayed, as appropriate, selected drill size—FIG. 3 shows a drill size of 2 mm. Adjacent to the drill size area is another area in which selected torque level is displayed. Adjacent symbol 24 (the question mark and screw symbol) indicates the selection of screwdriving with "smart learning".

Figure 4:
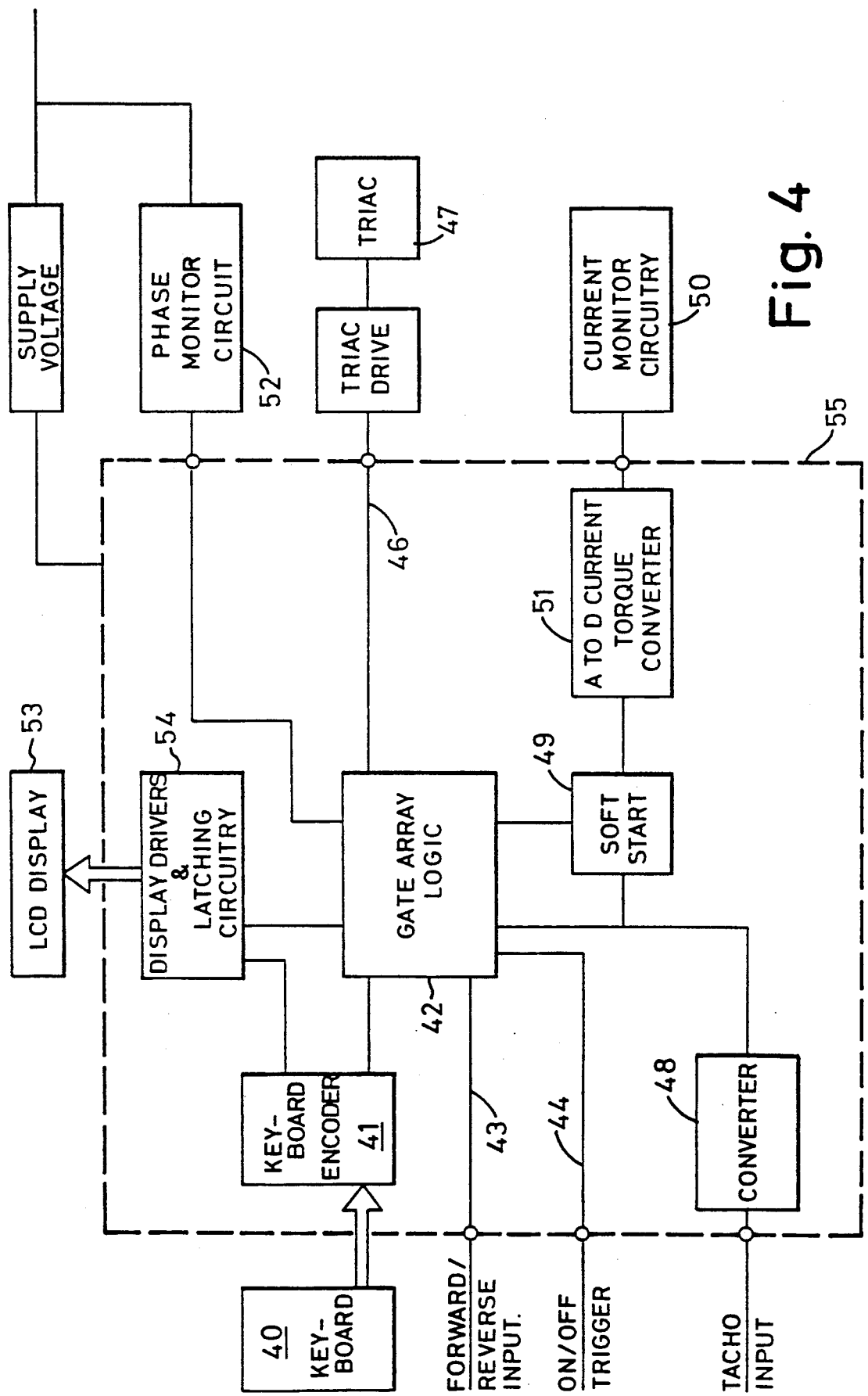
FIG. 4 is a explanatory block schematic of a motor control speed control means.

The drill motor is an A.C. motor energisation of which is controlled by a triac whose firing cycle is determined and initiated by motor control means of which FIG. 4 is an explanatory block schematic.

The keyboard is shown as block 40 and the individual keys are not shown. When the drill is in use, operation of a key is signalled to a keyboard encoder indicated by block 41 and whose output consists of a binary coded word characterising the particular function, material or other parameter selected by the key operation.

The binary coded words form inputs to a gate array logic indicated by block 42. Also applied to block 42 along lines 43, 44 respectively are signals indicating the state of the reversing switch, and the ON/OFF switch referred to above.

Block 42 consists of an array of gates which act as a switching matrix to convert received signals into an output on lead 46 that characterises the required operating cycle of a triac represented by block 47 that regulates the energisation of the drill motor.

Unlike other proposals, the control means does not employ a microprocessor or microcomputer nor does it comprise what is conventionally described as a read-only memory.

Whilst the drill motor is energised, its actual running speed is sensed by a tachometer whose output is fed to a converter represented by block 48 that converts the output into binary coded signals that are fed into the gate array 42 and are used to maintain the motor speed at the determined value.

Also provided is the now conventional 'soft-start' for the drill motor and the electronics for these are represented by block 49.

For reasons that will become apparent below, drill motor current is monitored as indicated by block 50 whose output is fed to an analogue to digital converter represented as block 51.

Timing for some of the operations carried out by the switching matrix is obtained from the mains supply via a phase monitor circuit represented by block 52. Other timing functions are supplied by an oscillator (not shown).

The LCD display represented by block 53 is controlled by display drivers and latching circuits shown as block 54 in accordance with inputs from the counters and key encoder and from the gate array logic.

The blocks enclosed by the dotted line 55 are engineered as a single chip application specific integrated circuit providing the facilities now to be described.

When the drill is first connected to the mains power supply, all symbols on the display are energised and appear for a short period, for example, one second.

A safety circuit is provided to prevent the energisation of the drill motor if, inadvertently, the trigger has been left in the 'locked-on' position after a previous use. In this case, the "Fault Symbol" will be displayed and this indicates to the user that the trigger must be released.

When the short period of time elapses, the control means will automatically proceed to set up the default conditions for a drilling operation for a workpiece made of wood and using a 2 mm drill. At the same time, symbols indicating that condition will flash. The remaining displayed symbols do not flash.

If that condition is the one required by the user, the trigger is then actuated. That action results in the disappearance from the display of all the symbols other than those representing the selection, and the smooth acceleration of the drive motor up to a speed of 2600 rpm. The motor speed is displayed as the motor is energised and the display will change until a speed of 2600 rpm is reached when the energisation of the motor is controlled to remain at that speed. Speed control is effected by the tachometer input referred to above.

Other drill sizes than 2 mm can be selected by a user. However, the selection can be made only from a defined range of drill sizes as is explained above. The gate array is so organised and connected that the selection can be made from a range of from 2 mm to 25 mm in steps of 1 mm. For each of the drill sizes and for the material wood, the gate array is organised to convert the coded output signals from the keyboard encoder into an output signal on lead 46 that results in a triac firing cycle that will set the energisation of the motor to attain a motor speed appropriate to the drill size and material.

If the user wishes to change the drill size, it is necessary to operate either of the + or − keys and so step through the range of available drill sizes and the steps will be shown on the display screen.

Once the trigger has been depressed, no change can be made to the selected drill size.

If the user wishes to drill in one of the other materials from the fixed range of materials, key M is actuated to step from wood to masonry and so on. Once the material selection has been made, only the symbol representing the selected material will be displayed.

A selection can then be made from the fixed range of drill sizes as described above and once the selection has been made, the gate array will convert the relevant coded input signals into an output on lead 46 that will result in a motor speed appropriate to the selected material and drill size.

As an example, the following fixed ranges of drill sizes are provided for the different materials

| WOOD | 2 mm–25 mm |
|---|---|
| MASONRY | 2 mm–19 mm |
| STEEL | 2 mm–13 mm |
| ALUMINIUM | 2 mm–13 mm |

If the user wishes to use the screwdriving function, one depression of key F will select screwdriving slow speed. The materials and drill size symbols will disappear from the display screen and the non-hammer symbol 20 will flash to warn the user that he should ensure that the drill is in the non-hammer mode by checking that the hammer—non-hammer selector is in the non-hammer position.

In addition, the letter E will appear in the bottom right-hand corner of the display screen to indicate the maximum level of motor torque that the drill motor will reach before being de-energised.

The letter E indicates one of a range of torque levels from which a selection can be made by a user. The range is from the lowest level represented by the letter A on the display screen to the highest level represented by letter I, thus there are nine different levels.

Once a selection has been made of torque level and the trigger depressed, the motor will be energised to attain a speed of 200 rpm.

The user is required to experiment to identify the level required for the size of screw and the nature of the material into which the screw is to be driven.

Further actuation of the F key will step on to screwdrive fast speed. In this condition, the operation is as just described except that the motor will reach a maximum speed of 600 rpm.

In both screwdriving operations just described, the control means monitors the applied torque and when the selected level is reached, the motor is de-energised.

A further facility is available to a user when screwdriving. That facility is screwdriving—smart learning and is selected by one actuation of the + key when the display shows torque level I. The display will then show A? adjacent the screw symbol.

Once that facility has been selected, the user does not select a torque level but simply actuates the trigger to drive in the screw. The torque level is sensed and when the screw has been driven home and the trigger released, the gate array will retain the then existing torque level and will use it for each subsequent screwdriving operation. To release from the smart learning facility, it is necessary to actuate either the + or − key to select one level of the defined range of torque levels.

One operation of key F from screwdriving—fast speed selects wire brushing. Material and diameter or torque level indications disappear from the screen and symbols 13, 20 and 22 flash. When the trigger is actuated, the flashing symbols remain in a steady condition and all other symbols disappear. With this condition selected, the gate array converts the coded signals from the keyboard to an output signal that will allow the motor to run at a speed of 2600 rpm.

A further single operation of key F will select hole cutting in wood with a hole cutter of 25 mm diameter.

If that is what the user requires, actuation of the trigger will result in energisation of the motor to run at 1300 rpm. The user can select a hole cutter of a different size from a range of sizes by actuating of either the + or − keys. The hole size diameters available range from 25 mm to 74 mm. These are incremented in the following steps 25, 32, 38, 45, 50, 56, 60, 62, 67, 74. The motor speed from the 25 mm diameter is 1300 rpm whilst for the range 32–38, the speed is 900 rpm and for the remaining sizes the speed is 700 rpm.

The hole cutting facility can be used with both aluminium and steel but not masonry. In the case of aluminium and steel the motor operates at the same speed 900 rpm regardless of the size of hole cutter used. Additionally, there is no display of hole size.

The remaining selectable function is polishing. When this function is selected, the material and diameter symbols disappear but symbol 15 will flash. On actuation of the trigger, the symbol 15 will remain on and the drill motor will accelerate smoothly to a maximum speed of 1000 rpm.

Should the user wish to cancel keyed-in instructions for any reason, he simply presses key C. That causes the control means to revert to a default condition which is the combination drilling, wood, drill diameter 2 mm. From that condition, the user can proceed to key-in again.

Certain provisions are also made for the protection of the user. The gate array ensures that the motor cannot be energised if the trigger is in the locked-on condition when the drill is connected to the mains supply.

Additionally, the motor cannot be energised if the reverse control has been actuated except under the following conditions. If the drill bit meets sufficient restraint during a drilling operation to stop suddenly in the workpiece, the motor is automatically de-energised. If that occurs, the reverse control may be operated and the trigger actuated to facilitate withdrawal of the drill bit from the workpiece. The motor speed in reverse is 400 rpm. This safety feature is referred to as anti-kick back and reversal i available for the one actuation of the trigger following the stoppage.

Symbol 23 is displayed if a fault occurs in the motor circuit or in the gate array.

It will be appreciated that the use of jogging keys reduces the number of keys needed to select a particular combination of required operating conditions and this simplifies considerably the setting-up of the tool prior to its use. By following the changes in the display, as keys are operated, the user knows immediately which of the available variables he has selected.

It will be appreciated that other functions and selections will be required for other types of power tool.

For example, a router may include a keyboard providing facilities for material selection and cutter speed selection for the range of materials. Similarly, a jig saw may have a keyboard providing facilities for thickness of material, nature of material of the work piece and type of saw blade to be used.

The invention may also be embodied in bench mounted power tools.

We claim:

1. A multi-function power tool comprising an electric motor, a tool holder drivable by the motor, control means for regulating the energization of the motor in accordance with a selected combination of operating conditions under which the tool is to be used, a keyboard located on the housing of the tool for inputting information to the control means to define the selected combination of operating conditions, the keyboard comprising a first single key operable by a user to input a selected tool function from a range of tool functions defined by the control means, a second single key operable by the user to input a selected workpiece material from a range of workpiece materials defined by the control means, at least one further key operable by the user to input, from a range defined by the control means in dependence upon the selections resulting from operation of the first and second keys, a parameter appropriate to the selected tool function and material, and a visual display also located on the housing of the tool and energisable to display symbols indicative of at least the selected function and, where applicable, a symbol indicative of the parameter.

2. A power tool as claimed in claim 1 in which a second further key is provided, one of said two further keys steps the parameter from one end of the defined range to the other, and the other of said two further keys the parameter in the opposite direction.

3. A power tool as claimed in claim 1 in which a "cancel" key is provided, operation of which inputs a predetermined combination of operating conditions to the control means.

4. A power tool as claimed in claim 1 in which energisation of the motor is controlled by a trigger-operated switch fitted with lock-on facilities, and in which there is a safety circuit responsive to the condition of the switch and which inputs that condition to the control means and, in the event that the switch is in the locked-on condition, energisation of the motor is prevented and a fault symbol is displayed on the display.

5. A power tool as claimed in claim 1 in which speed sensing means are provided for sensing the actual motor speed and for indicating the sensed speed to the control means which uses the indication to maintain the motor speed at a determined value.

6. A power tool as claimed in claim 1 in which the control means operates, on energisation, to cause the display to display all the symbols for a limited time period only.

7. A power tool as claimed in claim 6 in which, on expiry of the limited time period, the control means operates to set up a predetermined combination of operating conditions.

8. A multi-function hand-held power tool comprising an electric motor, a tool holder drivable by the motor, control means for regulating the energization of the motor in accordance with a selected combination of operating conditions under which the tool is to be used, a keyboard for inputting information to the control means to define the selected combination of operating conditions, the keyboard comprising a first single key for selecting a required tool function from a range of tool functions defined by the control means and including drilling and screwdriving, a second single kay operable to select a required workpiece material from a range of materials defined by the control means and including wood and masonry, at least one further key for selecting, in the event that drilling is selected, a drill size from a range of drill sizes defined by the control means, or in the event that screwdriving is selected, for selecting a torque level from a range of torque levels defined by the control means, and a visual display energisable to display symbols indicative of the selected function, selected material, the drill size, and torque level.

9. A power tool as claimed in claim 8 in which the defined range of tool functions further includes hole cutting and/or wire brushing and/or polishing.

10. A power tool as claimed in claim 8 in which the defined range of materials further includes steel and/or aluminium.

11. A power tool as claimed in claim 8 in which the range of torque levels includes a further level settable by torque responsive means at the termination of a screwdriving operation and retained by the control means for use in subsequent screwdriving operations carried out whilst the further level remains selected.

12. A multi-function power tool comprising an electric motor, a tool holder drivable by the motor, control means for determining the rotational speed of the motor in accordance with a user selected combination of operating conditions under which the tool is to be used, motor speed sensing means for sensing actual motor speed under conditions of use, said speed sensing means inputting to the control means which uses the input to maintain the motor speed at the determined speed, a keyboard located on the housing of the tool for inputting information to the control means to define the selected combination of operating conditions, the keyboard comprising a first single key operable to select a required tool function from a range of tool functions defined by the control means, a second single key operable to select a required workpiece material from a range of workpiece materials defined by the control means, at least one further key operable to select, from a range defined by the control means in dependence upon the selections resulting from operation of the first and second keys, a parameter appropriate to the selected tool function and material, and a visual display also located on the housing of the tool and energisable to display symbols indicative of at least the selected function and, where applicable, a symbol indicative of the parameter.

13. A multi-function power tool comprising an electric motor, a tool holder drivable by motor control means for regulating energization of the motor in accordance with a user selected combination of operating conditions under which the tool is to be used, motor speed sensing means for sensing actual motor speed under conditions of use, said motor speed sensing means inputting to the control means which uses the input to maintain the motor speed at a determined value, a keyboard for inputting information to the control means to define the selected combination of operating conditions, the keyboard comprising a first single key operable to input a selected tool function from a range of tool functions defined by the control means and including drilling and screwdriving, a second single key operable to input a selected workpiece material from a range of materials defined by the control means and including wood and masonry, at least one further key to input, in the event that drilling is selected, a drill size from a range of drill sizes defined by the control means, or in the event that screwdriving is selected, to input a torque level from a range of torque levels defined by the control means, means for sensing torque applied to the tool holder, said torque sensing means inputting to the control means which uses the input to de-energise the motor when the sensed torque level reaches the value of the selected torque level, and a visual display energisable to display symbols indicative of the selected function, selected material, the drill size, and torque level.

14. A multi-function, hand-held power drill, comprising:
 a tool housing having a handle portion containing an on/off switch;
 a tool holder chuck rotatably supported by said housing;
 a keyboard and display screen mounted adjacently on said housing;
 said keyboard having only five keys which are a workpiece material key, a tool function key, a step-up parameter key, a step-down parameter key, and a cancel key;
 control means for regulating energization of the power drill to drive said tool holder chuck, said control means receiving inputs from user operation of said keys and providing an output to said display screen;
 mode selection means for selecting between a hammer mode of operation and a non-hammer mode of operation;
 said workpiece material key being stepwise operable by the user to input a selected workpiece material from a range of workpiece materials defined by said control means;
 said tool function key being stepwise operable by the user to input a selected tool function from a range of tool functions including drilling, screwdriving, hole cutting, and polishing;
 said step-up parameter key being stepwise operable by the user to step-up through a range of a parameter provided and defined by said control means in dependence upon the inputs effected by operation of said workpiece material key and said tool function key, said parameter and/or said parameter range being different for different selected tool functions;
 said step-down parameter key being stepwise operable by the user to step-down through said range of said parameter so provided and defined by said control means;
 said cancel key being operative to cancel any previous inputs made by operation of the other four keys and selecting a default set of settings for the workpiece material, the tool function, and the parameter; and
 said display screen visually indicating at least the selected tool function.

15. The multi-function, hand-held power drill of claim 14, wherein said control means includes a keyboard encoder which inputs a gate array logic switching matrix, and display drivers which have inputs from both said keyboard encoder and said gate array logic switching matrix, said display drivers effecting the visual indication on said display screen.

16. The multi-function, hand-held power drill of claim 15, wherein said gate array logic switching matrix provides an output to a triac driver of a triac for said regulating energization of the power drill.

17. The multi-function, hand-held power drill of claim 16, further comprising a phase monitor circuit, a current monitor circuit, and a tacho input converter all providing inputs to said gate array logic switching matrix.

* * * * *